US007761704B2

(12) United States Patent
Ho et al.

(10) Patent No.: US 7,761,704 B2
(45) Date of Patent: Jul. 20, 2010

(54) METHOD AND APPARATUS FOR EXPIRING ENCRYPTED DATA

(75) Inventors: Min-Hank Ho, Newark, CA (US); Daniel ManHung Wong, Sacramento, CA (US); Chon Hei Lei, Alameda, CA (US); Thomas Keefe, Mill Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1106 days.

(21) Appl. No.: 11/084,346

(22) Filed: Mar. 17, 2005

(65) Prior Publication Data

US 2006/0210085 A1    Sep. 21, 2006

(51) Int. Cl.
*H04L 29/06* (2006.01)

(52) U.S. Cl. ............... 713/158; 380/28; 380/29; 380/30; 380/201; 380/228; 380/229; 380/259; 380/277; 380/278; 380/279; 380/280; 380/281; 380/282; 380/283; 380/285; 707/100; 707/103; 707/200; 711/163; 713/160; 713/161; 713/166; 713/171; 713/193; 713/200; 713/201; 709/200; 709/201; 709/203; 709/223; 709/224; 709/225; 709/226

(58) Field of Classification Search ............... 713/158
See application file for complete search history.

(56) References Cited

U.S. PATENT DOCUMENTS

| 6,915,435 | B1 * | 7/2005 | Merriam ............... 726/5 |
| 6,978,366 | B1 * | 12/2005 | Ignatchenko et al. ...... 713/166 |
| 2001/0019614 | A1 * | 9/2001 | Madoukh ............... 380/277 |
| 2005/0120064 | A1 * | 6/2005 | Sinha et al. ............ 707/206 |

* cited by examiner

*Primary Examiner*—Syed A. Zia
*Assistant Examiner*—Bryan Wright
(74) *Attorney, Agent, or Firm*—Park Vaughan & Fleming LLP; Laxman Sahasrabuddhe (57) ABSTRACT

One embodiment of the present invention provides a system that can expire encrypted-data. During operation, the system receives an expiry-request that includes object-identifying information, which can be used to identify a set of database objects that contain the encrypted-data, wherein a database object can be a table, a partition, a row, or a column in a row. Furthermore, a database object can have an expiration time, and it can be stored in an archive, which is typically used to store large amounts of data for long periods using a slower, but cheaper storage medium than the storage medium used by the database. The system then identifies a set of keys for the encrypted-data using the object-identifying information. Next, the system deletes the set of keys, thereby expiring the encrypted-data. Note that, deleting the set of keys ensures that the secure key repository does not contain any stale keys associated with expired encrypted-data.

20 Claims, 4 Drawing Sheets

METHOD AND APPARATUS FOR EXPIRING ENCRYPTED DATA

BACKGROUND

1. Field of the Invention

The present invention relates to data security. More specifically, the present invention relates to a method and apparatus for expiring encrypted data.

2. Related Art

As computer systems store ever-larger amounts of sensitive data, it is becoming increasingly important to protect this sensitive data from unauthorized accesses. The global costs incurred from such security breaches can run into billions of dollars annually, and the cost to individual companies can be severe, sometimes catastrophic.

Database systems typically use encryption to protect data. Encryption keys are often stored in a secure key repository that resides outside the database system. Unfortunately, in such situations, key management (i.e. creation, updating, or deletion of keys) can be a difficult task. This is because, on the one hand, removing old keys before the associated encrypted data expires can result in loss of vital information. On the other hand, storing keys indefinitely can lead to storage and security concerns.

Hence, what is needed is a method and an apparatus for managing keys that does not have above mentioned problems.

SUMMARY

One embodiment of the present invention provides a system that can expire encrypted-data. During operation, the system receives an expiry-request that includes object-identifying information, which can be used to identify a set of database objects that contain the encrypted-data, wherein a database object can be a table, a partition, a row, or a column in a row. Furthermore, a database object can have an expiration time, and it can be stored in an archive, which is typically used to store large amounts of data for long periods using a slower, but cheaper storage medium than the storage medium used by the database. The system then identifies a set of keys for the encrypted-data using the object-identifying information. Next, the system deletes the set of keys, thereby expiring the encrypted-data. Note that, deleting the set of keys ensures that the secure key repository does not contain any stale keys associated with expired encrypted-data.

In a variation on this embodiment, the object-identifying information can include: a System Change Number (SCN), which is a monotonically increasing counter that can be used to determine the order in which transactions are processed by the database; a user identifier; or an object identifier.

In a variation on this embodiment, the object-identifying information can include a predicate, which can be used to identify the set of database objects.

In a variation on this embodiment, the system identifies the set of keys for the encrypted-data by first identifying a set of database objects using the object-identifying information. Next, the system identifies a set of key-identifiers which are associated with the set of database objects. The system then sends a delete-request that includes the set of key-identifiers to a secure key repository.

In a further variation on this embodiment, the secure key repository receives the delete-request that includes the set of key-identifiers. Next, the secure key repository identifies the set of keys using the set of key-identifiers. The secure key repository can then delete the set of keys.

In a variation on this embodiment, the secure key repository is physically separate from the database system.

In a variation on this embodiment, a key identifier can include: a unique random number, which can be used to make the key identifier unique within the database system; an SCN; a user identifier; a timestamp; a global database identifier, which identifies a specific database instance in a collection of database instances; an object identifier; a row identifier; or a column identifier.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
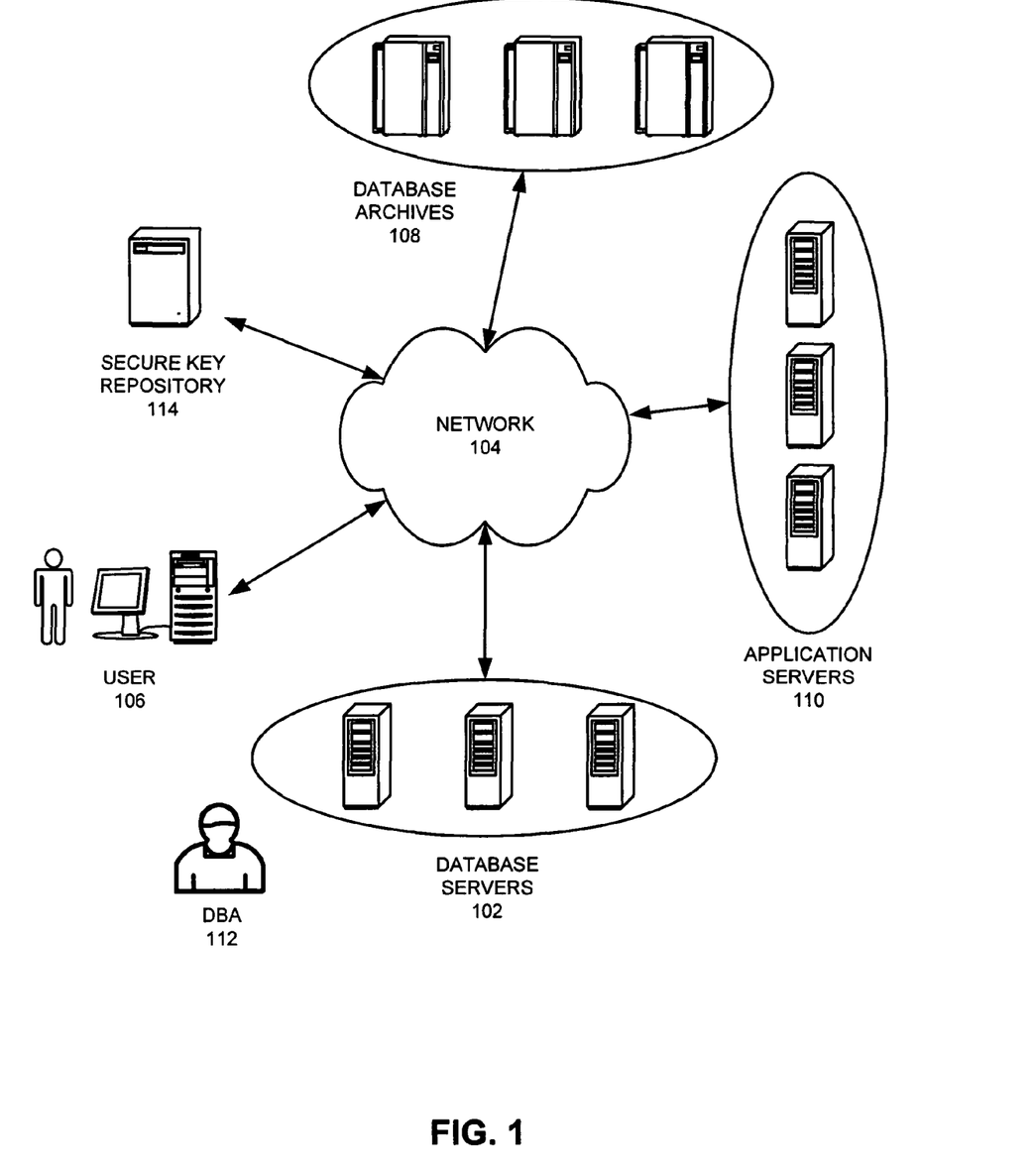
FIG. 1 illustrates an exemplary database system in accordance with an embodiment of the present invention.

FIG. 1 illustrates an exemplary database system in accordance with an embodiment of the present invention. A database system can include one or more application servers 110, one or more database servers 102, one or more database archives 108, one or more secure key repositories 114, and one or more database administrators (DBA) 112. Furthermore, user (or client) 106, application server(s) 110, database archive(s) 108, and database server(s) 102, and one or more secure key repositories 114 can communicate with one another via one or more networks 104.

A network can generally include any type of wire or wireless communication channel capable of coupling together computing nodes. This includes, but is not limited to, a local area network, a wide area network, or a combination of networks. In one embodiment, network 104 can include the Internet. Network 104 can also be a private network. Note that in some configurations application server(s) 110 and database server(s) 102 can be located on the same physical device. Furthermore, one or more secure key repositories 114 can be physically separate from the database server(s) 102.

Database server(s) 102 can store data using a variety of data storage systems. This includes, but is not limited to, systems based upon magnetic, optical, and magneto-optical storage devices, as well as storage devices based on flash memory and/or battery-backed up memory.

A database administrator (DBA) 112 is responsible for the operation and maintenance of database server(s) 102, and usually has privileges to modify data stored in a database storage device. Note that DBA 112 may or may not have privileges to modify the data stored in the database archive(s) 108.

Database clients allow a user, such as user 106, to enter data through a user interface, such as a web browser. This data can be sent to one of the application server(s) 110 across network(s) 104. The application server then forms a database query (or command) using the data supplied by user 106 and forwards this query (or command) to the database server(s) 102 across network(s) 104. Database server(s) 102 validate the query (or command) and, if valid, perform the requested operation.

Note that, if the query (or command) requires access to an encrypted database object, a database server can retrieve a key from a secure key repository, such as secure key repository 114, and then use the key to decrypt the encrypted-data contained within the encrypted database object.

Process for Creating an Encrypted Database Object

Figure 2:
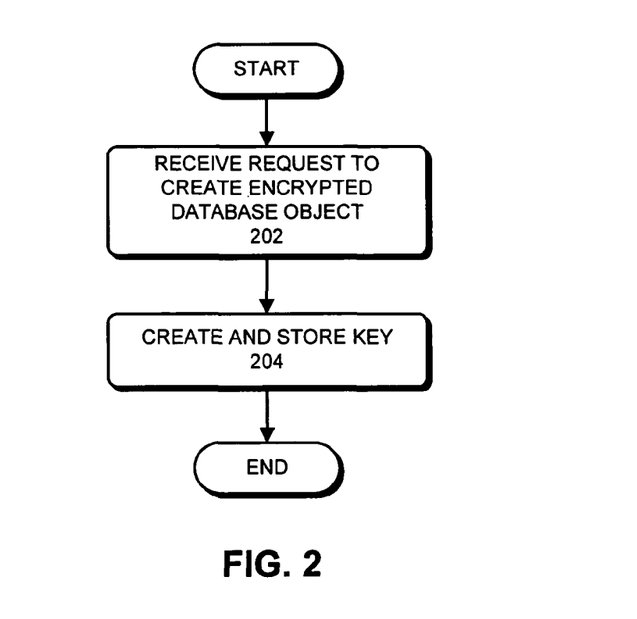
FIG. 2 presents a flowchart that illustrates a process for creating an encrypted database object in accordance with an embodiment of the present invention.

FIG. 2 presents a flowchart that illustrates a process for creating an encrypted database object in accordance with an embodiment of the present invention.

The process typically begins when the database receives a request to create an encrypted database object (step 202). Note that a database object can be a table, a partition, a row, or a column in a row. Furthermore, note that a database object can contain other database objects. For example, a table can contain one or more partitions, which can contain one or more rows, which, in turn can contain one or more columns.

Next, the system creates and stores a key which can be used to encrypt the database object (step 204). Furthermore, the system can associate the key with the encrypted database object, which allows the database to retrieve the key when the encrypted database object is accessed.

Additionally, in one embodiment, the system stores the key in a secure key repository (or key store), which can be located on a physically separate entity from the database server(s).

Note that in one embodiment, the system can associate a database global identifier (GID) and a System Change Number (SCN) with the key. (A GID can be used to identify a specific instance of a database system within a distributed database system. An SCN is typically a monotonically increasing counter that can be used to determine the order in which transactions are processed by a database.)

Specifically, the system can store the GID and SCN with the key in a secure key repository. Alternatively, this association can be accomplished by recording the GID, SCN, and a key identifier in one or multiple tables on one or multiple databases. Furthermore, this association can be accomplished by using a combination of the above two techniques. Once this association is created, the key management mechanism can use various techniques to compare the SCN with the metadata from the appropriate database (which can be identified using the GID) to determine whether a key in the key repository needs to be removed or updated.

Associating an SCN with a key can be useful in many scenarios. For example, it can be used to remove keys that are created during an aborted transaction. (Note that the database system can assign each transaction its own SCN to uniquely identify changes made within the transaction.)

Figure 3:
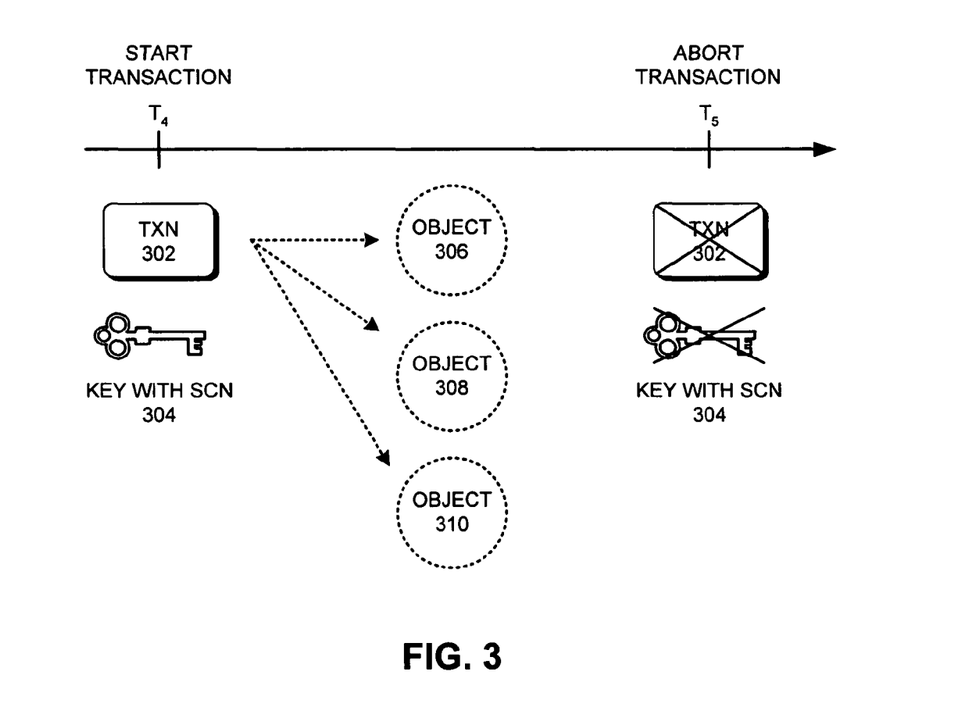
FIG. 3 illustrates how a System Change Number (SCN) can be used to delete keys that are created during an aborted transaction in accordance with an embodiment of the present invention.

FIG. 3 illustrates how a System Change Number (SCN) can be used to delete keys that are created during an aborted transaction in accordance with an embodiment of the present invention.

Transaction (e.g., a query or a command) 302 starts to execute at time $T_4$. During execution, key 304 is created and is associated with an SCN that corresponds to transaction 302. Next, the transaction creates or modifies encrypted objects 306, 308, and 310. The transaction is then aborted at time $T_5$ before completion. Note that the system can use the SCN to identify key 304 that is associated with the transaction. Additionally, deleting key 304 expires database objects 306, 308, and 310, which makes it impossible to decrypt these objects.

Figure 4:
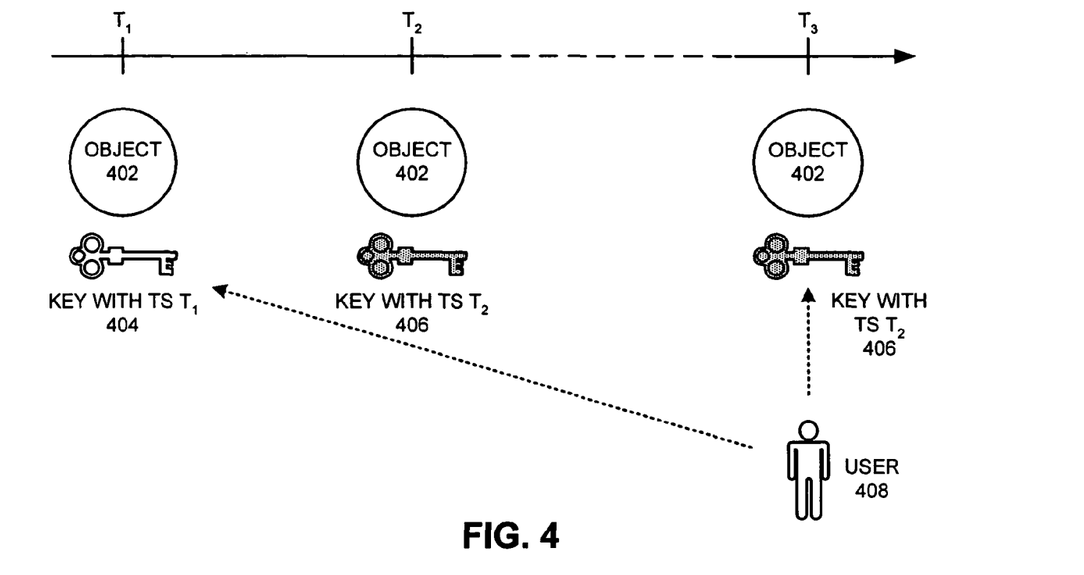
FIG. 4 illustrates how a database can use a timestamp to allow a user to view a database state at an earlier point in time in accordance with an embodiment of the present invention.

Database systems typically allow the system to change the key used for encrypting a database object. As a result, if a user wants to view the database state at an earlier point in time, the user may have to use a different key than the one that is currently being used. In one embodiment, the system can associate a timestamp with the key, thereby allowing the database to view the database state at an earlier point in time by retrieving the appropriate key for an encrypted database object.

FIG. 4 illustrates how a database can use a timestamp to allow a user to view a database state at an earlier point in time in accordance with an embodiment of the present invention.

Database object 402 is encrypted at time $T_1$ using key 404 with timestamp $T_1$. Next, object 402 is re-keyed at time $T_2$, i.e., object 402 is encrypted using another key 406 with timestamp $T_2$. Note that the system can use the timestamps to retrieve the appropriate key. For example, suppose user 408 wants to access object 402 using the current database state, i.e., at time $T_3$. Since object 402 was not re-keyed after time $T_2$, the system retrieves the correct key, namely, key 406, to decrypt object 402. On the other hand, if user 408 accesses object 402 using the database state at time $T_1$, the system can retrieve key 404 with timestamp $T_1$. Note that, in this example, if the system did not store timestamps with the keys, it would not be able to retrieve the appropriate key for a given database state.

Process for Encrypting and Storing Data

Figure 5:
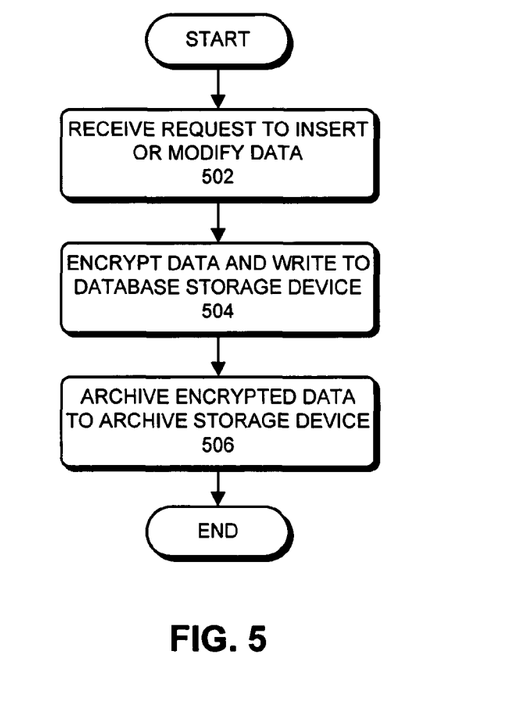
FIG. 5 presents a flowchart that illustrates a process for encrypting and storing data in accordance with an embodiment of the present invention.

FIG. 5 presents a flowchart that illustrates a process for encrypting and storing data in accordance with an embodiment of the present invention.

The process usually begins when the database system receives a request to insert or modify data (step 502).

Next, the system encrypts the data using a key and writes the encrypted data to a database storage device (step 504).

Then, at a later time, the system can archive the encrypted data to an archive storage device (step 506). Note that an archive storage device is typically used to store large amounts of data for long periods using a slower, but cheaper storage medium that the storage medium used by the database.

Note that, since a database archive is typically used to store database objects for longer periods, a database object can continue to exist in the archive even after it is deleted from the database. As a result, it may be necessary to store keys for encrypted database objects that have been deleted from the database, but still exist in an archive.

Furthermore, a DBA may not have permissions to delete data from an archive. Hence, it is advantageous to be able to expire data in an archive even if permission to delete data from the archive is not available. Note that by deleting the set of keys for the encrypted data, the system can enable a DBA to expire encrypted data even if the DBA does not have permission to delete data in the archive.

Process for Expiring Encrypted Data

Figure 6:
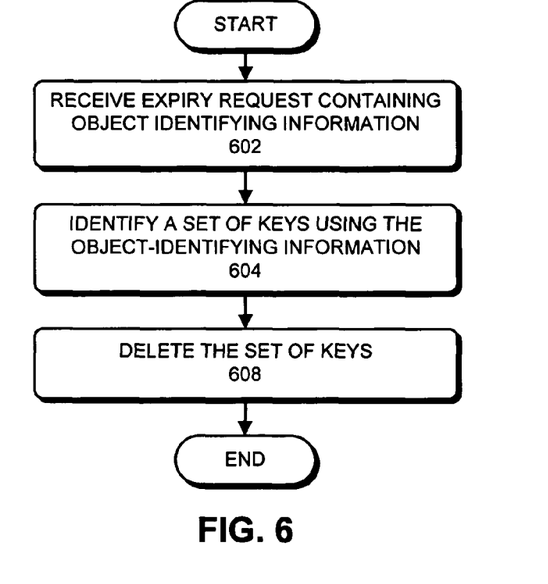
FIG. 6 presents a flowchart that illustrates a process for expiring encrypted data in accordance with an embodiment of the present invention.

FIG. 6 presents a flowchart that illustrates a process for expiring encrypted data in accordance with an embodiment of the present invention.

The process typically begins when the database receives an expiry request that includes object-identifying information which can be used to identify the set of encrypted database objects that need to be expired (step 602). Note that a database object can have an expiration time.

Next, the system identifies a set of keys using the object-identifying information (step 604). Note that the set of keys correspond to the set of encrypted database objects that contain the data that needs to be expired.

The system then deletes the set of keys (step 606). Note that deleting the set of keys makes it impossible to decrypt the data stored in the set of encrypted database objects, thereby expiring data contained in the set of encrypted database objects. Furthermore, note that deleting the set of keys expires the encrypted data regardless of where it is stored. Additionally, deleting the set of keys can ensure that the secure key repository does not contain any stale keys associated with expired encrypted-data.

These systems and techniques can enable true transactional key management, which can selectively remove or even re-key data based on user specified conditions. For example, these systems and techniques can be used to remove all keys created before a certain date. Alternatively, these systems and techniques can be used to delete all keys that protect a specific user's data. It will be apparent that a combination of a variety of conditions (including those described above) can also be used to identify and delete keys.

Process for Identifying a Set of Keys for Encrypted Data

Figure 7:
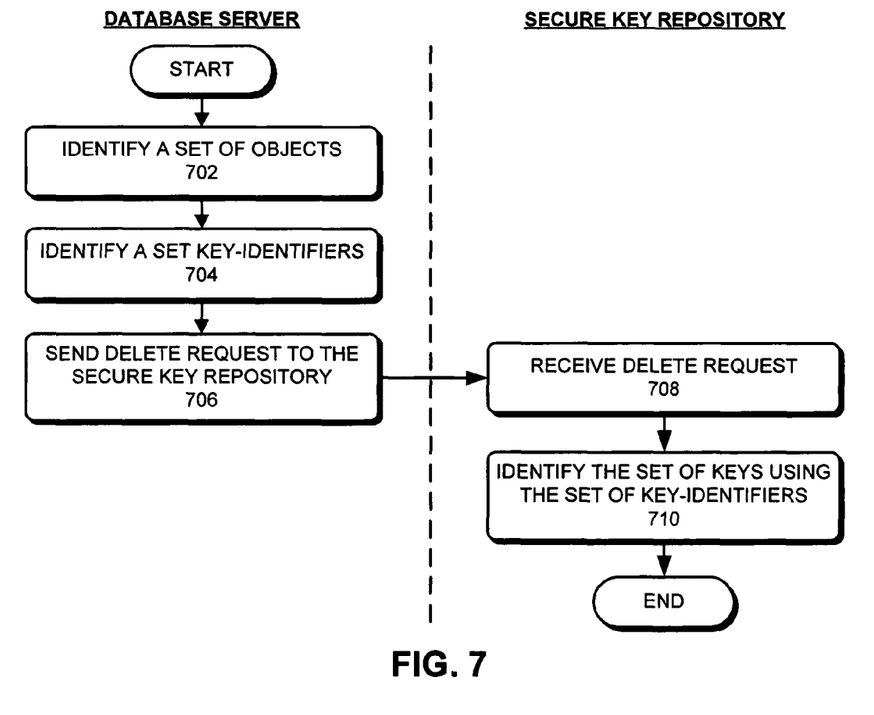
FIG. 7 presents a flowchart that illustrates a process for identifying a set of keys for encrypted data in accordance with an embodiment of the present invention.

FIG. 7 presents a flowchart that illustrates a process for identifying a set of keys for encrypted data in accordance with an embodiment of the present invention.

The process usually begins by identifying a set of encrypted database objects using the object-identifying information (step 702). Note that the object-identifying information can include a predicate to identify a set of encrypted database objects that need to be expired. Moreover, the object-identifying information can include the SCN, a user identifier, or an object identifier.

Next, the system can identify a set of key-identifiers associated with the set of encrypted database objects (step 704). Note that a key-identifier can be associated with an encrypted object in the database system. Furthermore, a key-identifier can include a number of fields that are associated with encrypted database objects. For example, a key-identifier can include an SCN, a user identifier, a timestamp, a global database identifier (GID), an object identifier, and a row identifier, or a column identifier.

The system can then send a delete request to a secure key repository (step 706). Specifically, the system can send the set of key-identifiers with the delete request so that the secure key repository can identify the set of keys that need to be deleted.

Next, the secure key repository can receive the delete request (step 708). In one embodiment, the secure key repository can be separate from the database system, while in another embodiment, the secure key repository can be integrated with the database system.

The secure key repository can then identify the set of keys using the set of key-identifiers that it received with the delete request (step 710).

Once the set of keys are identified, the secure key repository can delete them, thereby expiring the data.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing a database object in an encrypted database system, the method comprising:

receiving an access-request to access the database object's state at time T which occurred in the past, wherein the database object was encrypted using different keys at different times in the past, wherein the different keys are stored and associated with timestamps to indicate which key was used for encrypting the database object at any given time, and wherein each key is associated with a key-identifier, the key-identifier comprising:

a unique random number, a transaction-identifier which uniquely identifies a transaction and which is used to determine an order in which the database object needs to be expired, wherein the database object is created as part of the transaction, and a global database identifier which identifies a database among a collection of databases in a distributed database system;

determining a key which was used to encrypt the database object at time T, wherein a timestamp associated with the key indicates that the key was used to encrypt the database object at time T; and decrypting the database object's state at time T using the key.

2. The method of claim 1, wherein the method comprises:

receiving an expiration-request for expiring the database object's state at time T;

determining the key which was used to encrypt the database object at time T; and deleting the key, thereby expiring the database object's state at time T.

3. The method of claim 2, wherein deleting the key includes sending a delete-request to a secure key repository, wherein the delete-request includes the key-identifier associated with the key.

4. The method of claim 1, wherein prior to receiving the access-request, the method comprises:

receiving object-identifying information, wherein the object-identifying information identifies the database object; and identifying the database object by utilizing the object-identifying information.

5. The method of claim 4, wherein the object-identifying information includes one of:
- a monotonically increasing counter which is used to determine an order in which transactions are received by the encrypted database system;
- a user identifier; or
- an object identifier.

6. A computer-readable storage medium storing instructions that when executed by an encrypted database system cause the encrypted database system to perform a method for accessing a database object in the encrypted database system, the method comprising:
- receiving an access-request to access the database object's state at time T which occurred in the past, wherein the database object was encrypted using different keys at different times in the past, wherein keys are associated with timestamps to indicate which key was used for encrypting the database object at any given time, and wherein each key is associated with a key-identifier, the key-identifier comprising:
  - a unique random number,
  - a transaction-identifier which uniquely identifies a transaction and which is used to determine an order in which the database object needs to be expired, wherein the database object is created as part of the transaction, and
  - a global database identifier which identifies a database among a collection of databases in a distributed database system;
- determining a key which was used to encrypt the database object at time T, wherein a timestamp associated with the key indicates that the key was used to encrypt the database object at time T; and
- decrypting the database object's state at time T using the key.

7. The computer-readable storage medium of claim 6, wherein the method comprises:
- receiving an expiration-request for expiring the database object's state at time T;
- determining the key which was used to encrypt the database object at time T; and
- deleting the key, thereby expiring the database object's state at time T.

8. The computer-readable storage medium of claim 6, wherein deleting the key includes sending a delete-request to a secure key repository, wherein the delete-request includes the key-identifier associated with the key.

9. The computer-readable storage medium of claim 6, wherein prior to receiving the access-request, the method comprises:
- receiving object-identifying information, wherein the object-identifying information identifies the database object; and
- identifying the database object by utilizing the object-identifying information.

10. The computer-readable storage medium of claim 9, wherein the object-identifying information includes one of:
- a monotonically increasing counter which is used to determine an order in which transactions are received by the encrypted database system;
- a user identifier; or
- an object identifier.

11. A method for expiring database objects, the method comprising:
- receiving a transaction-request to perform the transaction in a database system, wherein the transaction is associated with a transaction-identifier which uniquely identifies the transaction and which is used to determine an order in which database objects that need to be expired, wherein the database objects are created as part of processing the transaction;
- creating a key to encrypt the database objects associated with the transaction;
- associating the key with a key-identifier, wherein the key identifier comprises a unique random number, the transaction-identifier, and a global database identifier which identifies a database among a collection of databases in a distributed database system;
- encrypting the database objects using the key;
- storing the key in a secure key repository;
- receiving an expiry-request that comprises an object identifier associated with the database objects, wherein the expiry-request indicates that the database objects need to be expired;
- responsive to receiving the expiry-request, deleting the key from the secure key repository, thereby expiring the database objects which were created as part of processing the transaction and ensuring that the secure key repository does not store stale keys associated with the expired database objects.

12. The method of claim 11, wherein deleting the key includes sending a delete-request to the secure key repository, wherein the delete-request includes the key-identifier.

13. The method of claim 11, wherein the transaction-identifier includes:
- a system change number (SCN) which uniquely identifies transactions within the database system.

14. The method of claim 11, wherein the database objects are one or more of:
- a table;
- a partition;
- a column; and
- a row in a column.

15. A computer-readable storage medium storing instructions that when executed by a database system cause the database system to perform a method for expiring database, the method comprising:
- receiving a transaction-request to perform the transaction in the database system, wherein the transaction is associated with a transaction-identifier which uniquely identifies the transaction and which is used to determine an order in which database objects need to be expired, wherein the database objects are created as part of processing the transaction;
- creating a key to encrypt the database objects associated with the transaction;
- associating the key with a key-identifier, wherein the key identifier comprises a unique random number, the transaction-identifier, and a global database identifier which identifies a database among a collection of databases in a distributed database system;
- encrypting the database objects using the key;
- storing the key in a secure key repository;
- receiving an expiry-request that comprises an object identifier associated with the database objects, wherein the expiry-requests indicates that the database objects need to be expired;
- responsive to receiving the expiry-request, deleting the key from the secure key repository, thereby expiring the database objects which were created as part of processing the transaction and ensuring that the secure key repository does not store stale keys associated with the expired database objects.

16. The computer-readable storage medium of claim 15, wherein deleting the key includes sending a delete-request to the secure key repository, wherein the delete-request includes the key-identifier.

17. The computer-readable storage medium of claim 15, wherein the transaction-identifier includes:

a system change number (SCN) which uniquely identifies transactions within the database system.

18. The computer-readable storage medium of claim 15, wherein the database objects are one or more of:

a table;

a partition;

a column; and a row in a column.

19. The method of claim 11, further comprising:

receiving an abort-request to abort the transaction, wherein the abort-request is received before the transaction is completed; and in response to receiving the abort-request, using the transaction-identifier to determine the key which was used to encrypt the database object.

20. The computer-readable storage medium of claim 15, wherein the method further comprises:

receiving an abort-request to abort the transaction, wherein the abort-request is received before the transaction is completed; and in response to receiving the abort-request, using the transaction-identifier to determine the key which was used to encrypt the database object.

* * * * *

UNITED STATES PATENT AND TRADEMARK OFFICE
CERTIFICATE OF CORRECTION

| | | |
|---|---|---|
| PATENT NO. | : 7,761,704 B2 | |
| APPLICATION NO. | : 11/084346 | |
| DATED | : July 20, 2010 | |
| INVENTOR(S) | : Min-Hank Ho et al. | |

It is certified that error appears in the above-identified patent and that said Letters Patent is hereby corrected as shown below:

On cover page, item (74), in column 2, in "Attorney, Agent or Firm", line 1, delete "Park Vaughan" and insert -- Park, Vaughan --, therefor.

Signed and Sealed this
Tenth Day of May, 2011

David J. Kappos
*Director of the United States Patent and Trademark Office*